US012052162B2

(12) United States Patent
Sharma et al.

(10) Patent No.: US 12,052,162 B2
(45) Date of Patent: Jul. 30, 2024

(54) SYSTEMS AND METHODS FOR PATH DETERMINATION IN A NETWORK

(71) Applicant: Comcast Cable Communications, LLC, Philadelphia, PA (US)

(72) Inventors: Alankar Sharma, Moorestown, NJ (US); Priya Kanago, Moorestown, NJ (US); Charles Robert Conte, Gaithersburg, MD (US); Saurabh C. Shah, Monroe, CT (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/157,465

(22) Filed: Jan. 25, 2021

(65) Prior Publication Data

US 2022/0239584 A1    Jul. 28, 2022

(51) Int. Cl.
*H04L 12/721* (2013.01)
*H04L 1/08* (2006.01)
*H04L 12/18* (2006.01)
*H04L 45/12* (2022.01)
*H04L 45/74* (2022.01)

(52) U.S. Cl.
CPC ............. *H04L 45/127* (2013.01); *H04L 1/08* (2013.01); *H04L 12/18* (2013.01); *H04L 45/74* (2013.01)

(58) Field of Classification Search
CPC . H04W 40/12; H04W 40/24; H04W 72/1231; H04W 40/246
See application file for complete search history.

(56) References Cited

U.S. PATENT DOCUMENTS

| | | | | |
|---|---|---|---|---|
| 8,510,551 | B1 * | 8/2013 | Desai | H04L 12/18 709/227 |
| 9,059,901 | B1 * | 6/2015 | Kumar C S | H04L 49/557 |
| 9,374,303 | B1 * | 6/2016 | Ulman | H04L 12/18 |
| 2011/0225311 | A1 * | 9/2011 | Liu | H04L 45/125 709/231 |
| 2013/0170490 | A1 * | 7/2013 | Kreeger | H04L 41/12 370/390 |

FOREIGN PATENT DOCUMENTS

EP    3113424 B1    10/2018
WO    WO 2014/124153 A1 *    8/2014    ............ H04W 40/28

* cited by examiner

*Primary Examiner* — Mansour Oveissi
(74) *Attorney, Agent, or Firm* — Ballard Spahr LLP

(57) ABSTRACT

A sending node may send a network message to a multicast IP address. The sending node and a recipient node may be in communication via a plurality of intermediary nodes. The recipient node may receive a number of copies of the network message that corresponds to a number of equal cost paths between the sending node and the recipient node. The recipient node may send a reply to each of the copies of the network message to the sending node. The sending node may provide the replies to a collector module, which may use the replies for network analytics, network monitoring, machine learning, and the like.

20 Claims, 8 Drawing Sheets

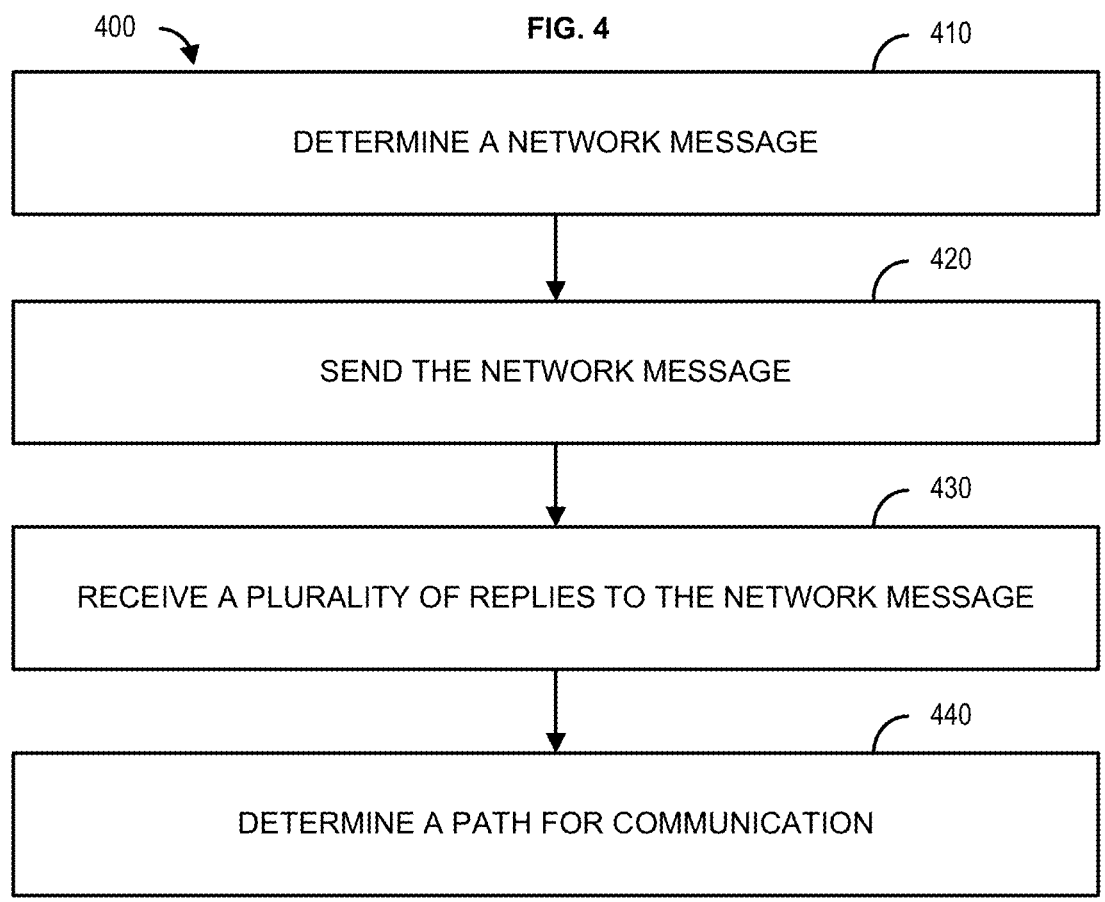

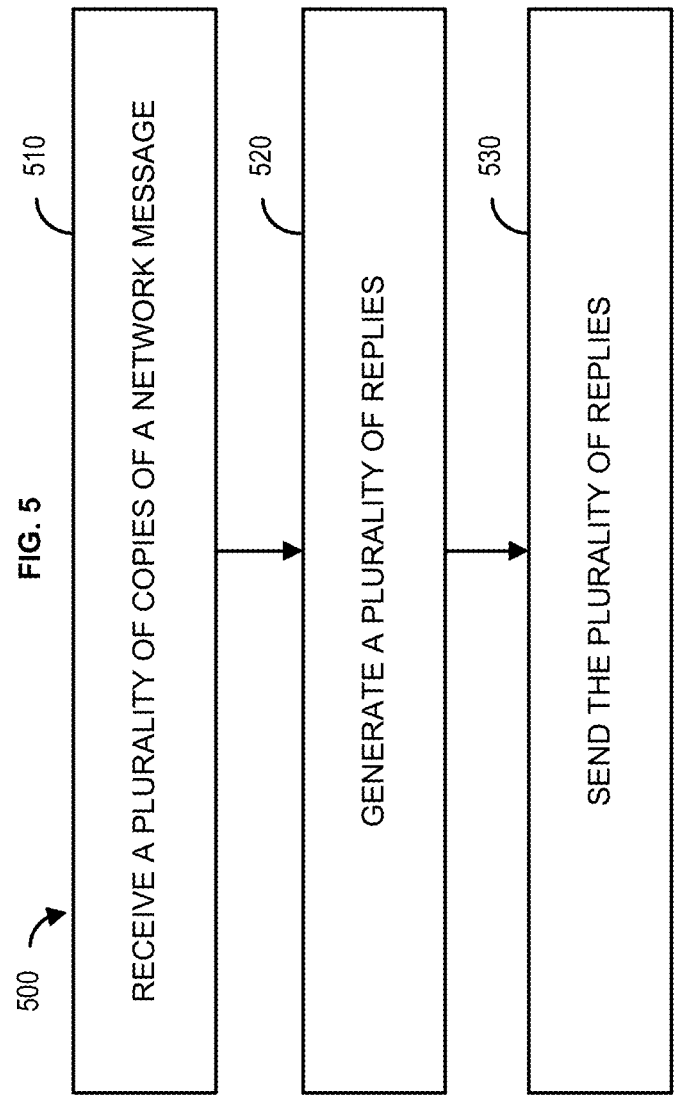

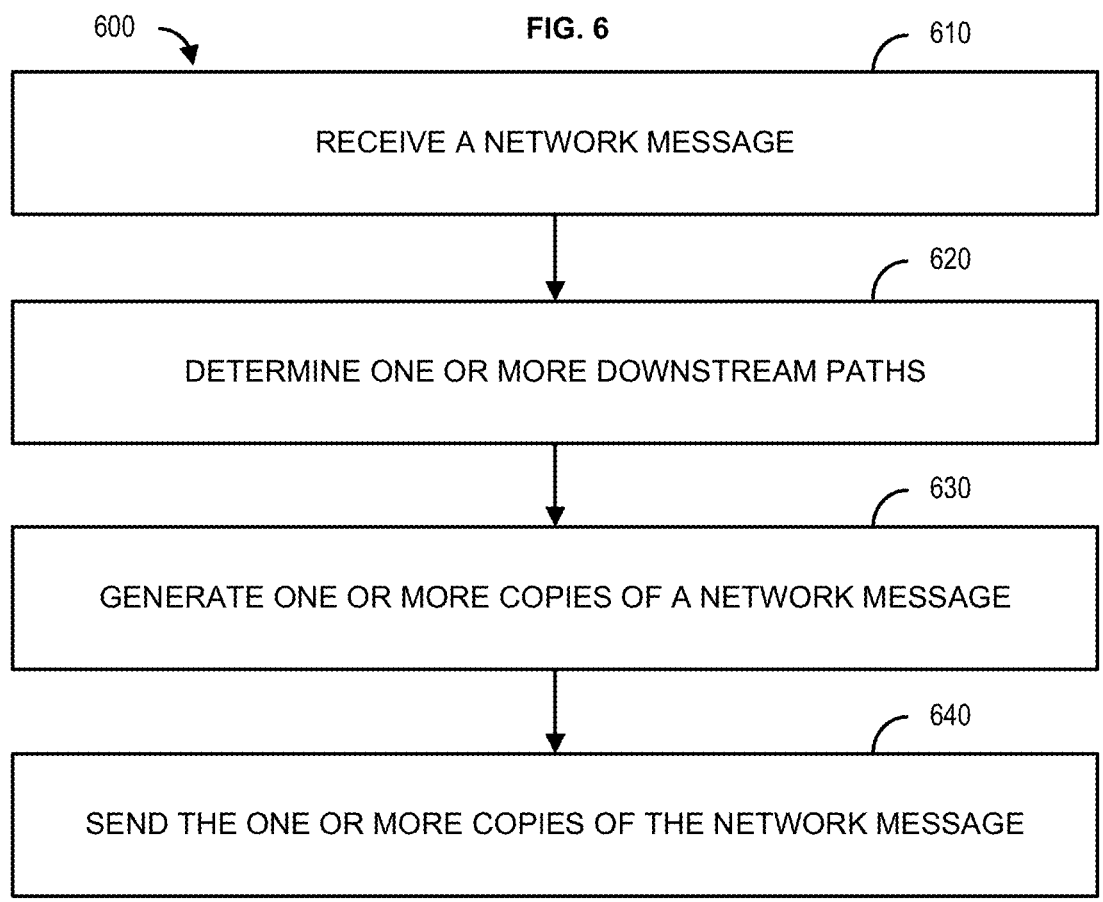

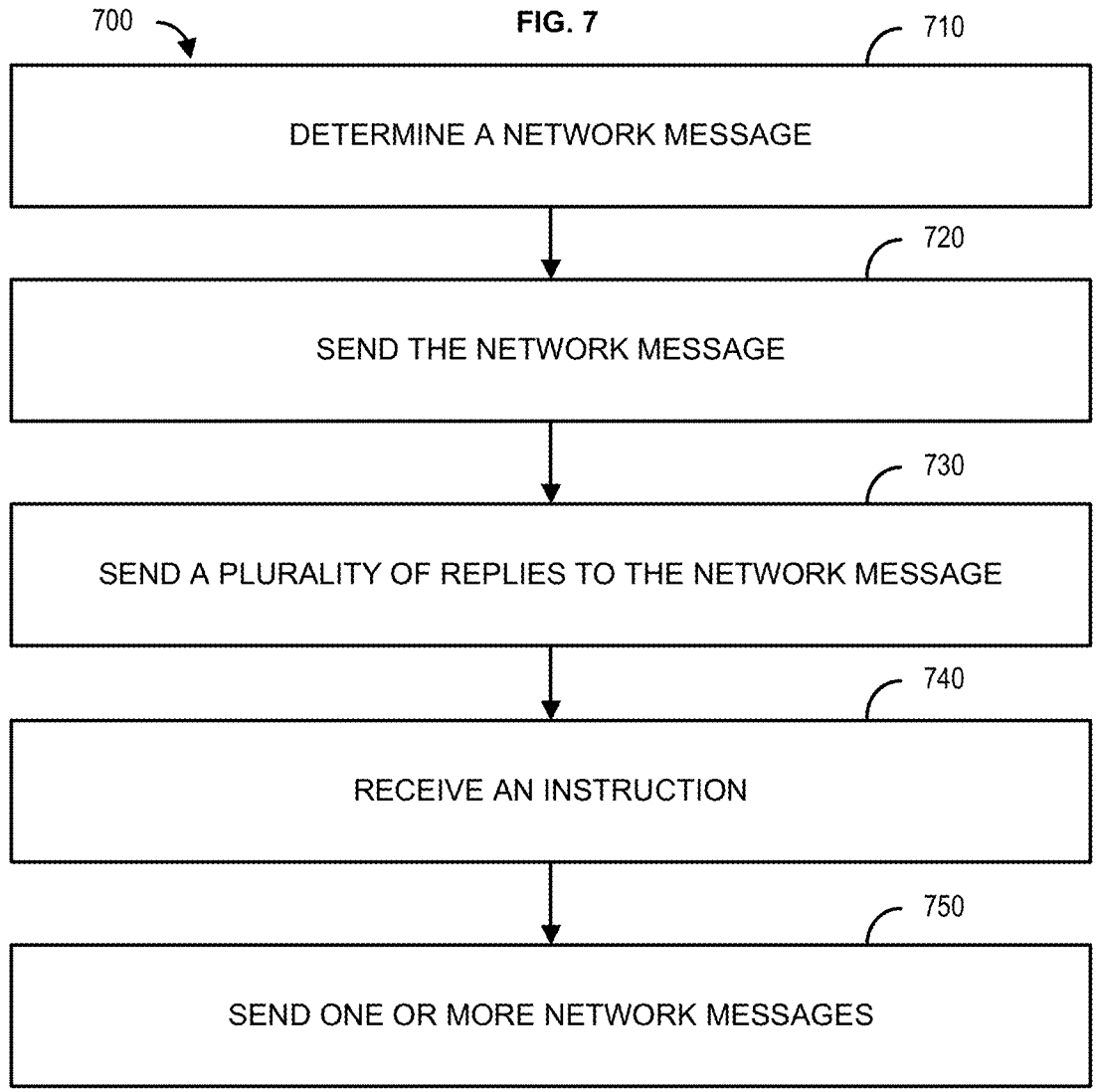

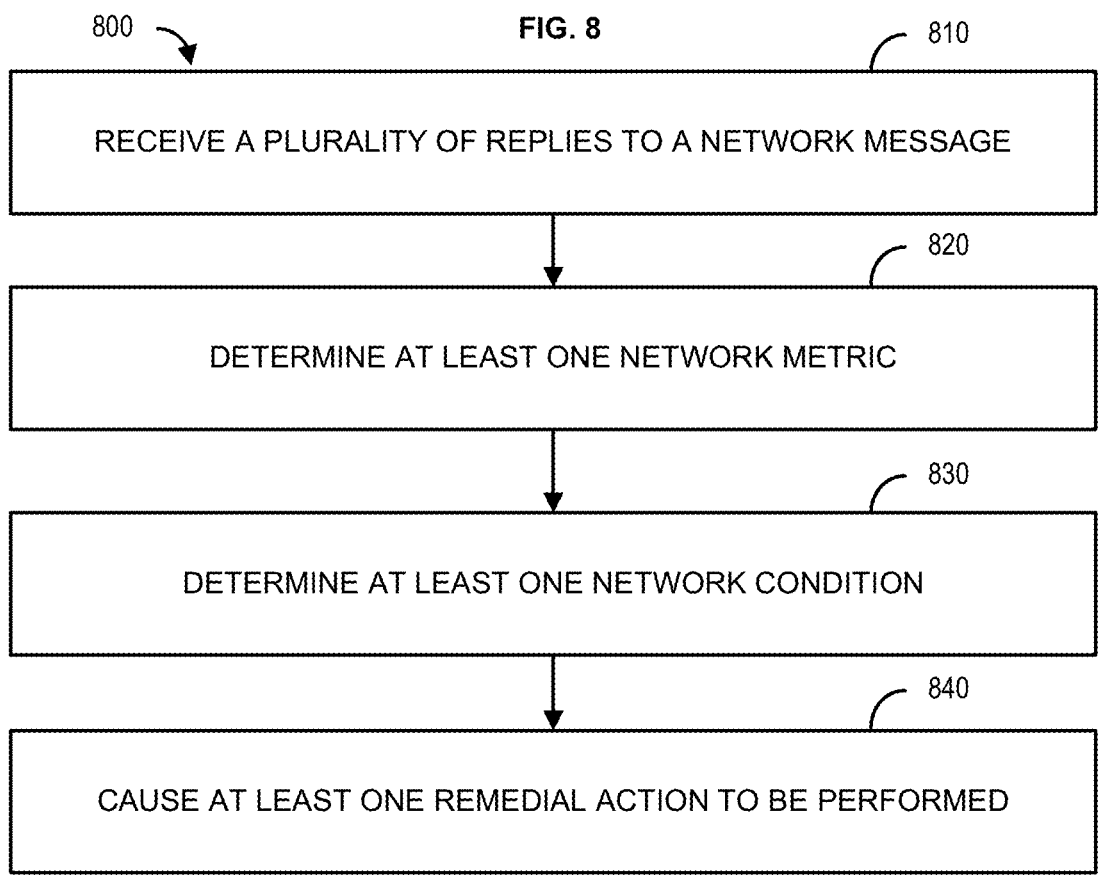

SYSTEMS AND METHODS FOR PATH DETERMINATION IN A NETWORK

BACKGROUND

As more devices become Internet-capable, ensuring strong and consistent network access has become crucial. Traffic loss, latency, and end-to-end path availability are just a few examples of network conditions that need to be monitored in order to provide strong and consistent network access. Additionally, in larger networks, backup end-to-end paths and/or nodes must be routinely determined to account for potential failover and network resiliency. These and other considerations are described herein.

SUMMARY

It is to be understood that both the following general description and the following detailed description are exemplary and explanatory only and are not restrictive. Provided herein are methods and systems for path determination in networks having multiple end-to-end paths between nodes. The present methods and systems may determine all possible end-to-end paths between nodes in a network using a single network message (e.g., a data packet) that is sent by a given endpoint node (e.g., a sending node). For example, a sending node may determine/generate a network message. The sending node may send the network message. The sending node and at least one recipient node may be in communication via a plurality of intermediary nodes within the network.

Each of the intermediary nodes may be configured to determine one or more downstream paths and to send one or more copies of the network message via the one or more downstream paths. Each copy of the network message sent by each particular intermediary node may include metadata relating to that particular intermediary node and/or one or more other intermediary nodes in the particular downstream path. The network message—and copies thereof—may traverse a number of hops within the plurality of intermediary nodes. The recipient node may receive a number of copies of the network message. For example, the recipient node may receive a number of copies of the network message that corresponds to a number of possible end-to-end paths between the sending node and the recipient node. The recipient node may reply to each of the copies of the network message. The sending node may receive each of the replies. The sending node may provide the replies to a collector module, which may be resident at the sending node or at another device/node associated with the network. The collector module may use the replies to determine a path for communications between the sending node and the recipient node, one or more network conditions, a combination thereof, and/or the like.

Other examples and configurations are possible. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 4 shows a flowchart of an example method;
FIG. 5 shows a flowchart of an example method;
FIG. 6 shows a flowchart of an example method;
FIG. 7 shows a flowchart of an example method;
and
FIG. 8 shows a flowchart of an example method.

DETAILED DESCRIPTION

Figure 1:
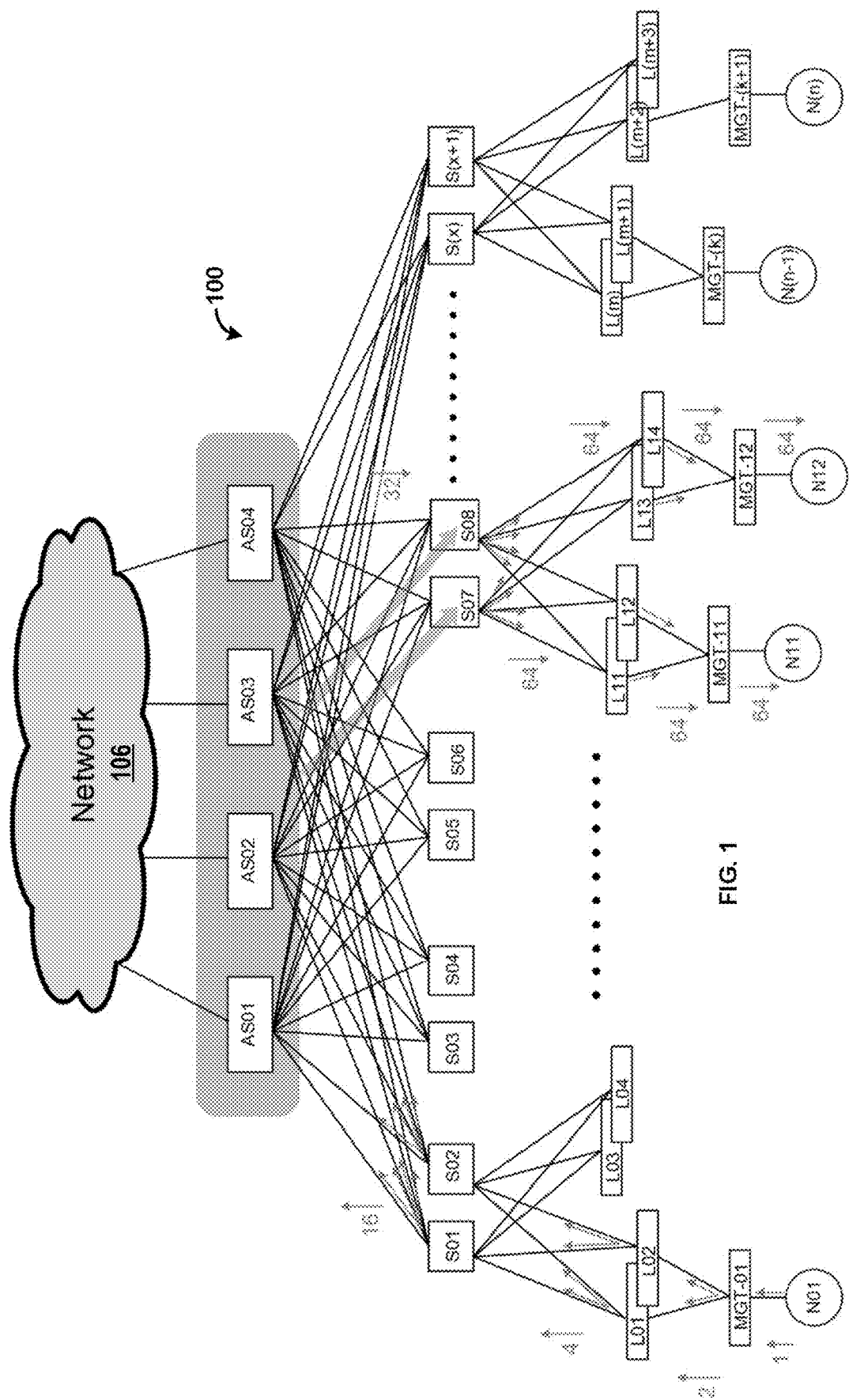
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium may be implemented. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Provided herein are methods and systems for path determination in networks having multiple end-to-end paths between nodes. To account for potential failover and network resiliency, backup end-to-end paths and/or nodes must be routinely determined. Existing solutions require continuous measurements, which are expensive in terms of network bandwidth, computational resources, storage, management, etc. For example, the existing solutions require the sending of a test data packet from each node of interest to all other nodes in the network. This may result in tens of millions of data packets for a mid-sized or larger network (e.g., $n^2$ data packets need to be sent, where n equals the number of nodes in the network). The present methods and systems improve upon the existing solutions in several ways. As an example, the present methods and systems require only one data packet to be sent from each node of interest to all the other nodes in the network. Thus, the number of data packets that need to be sent in order for analysis and path determination in the entire network is on the order of n, where n equals the number of nodes in the network. As a result, the present methods and systems are more efficient than the existing solutions in terms of computational and network resources that are required. This improvement is critical for networks where one or more nodes may be small Internet-capable devices (e.g., Internet of things (IoT) devices) that have limited computing and/or energy resources.

Additionally, the existing solutions do not efficiently account for multiple end-to-end paths that exist between any two nodes in the network (e.g., two or more paths having an equal number of "hops" between any two nodes). In order to account for all such multiple end-to-end paths, according to the existing solutions, each node may need to send upwards of thousands of data packets to each of the other nodes in the network. The reason that such a high number of data packets are required is due the existing solutions' reliance on packet entropy and hashing. For example, according to the existing solutions, when there are hundreds of multiple end-to-end paths in a network, hashing algorithms are used to discover all possible end-to-end paths between any two nodes. Since nodes in a network typically share a single network IP address, the only variables that change according to these hashing algorithms are the destination port numbers and the source port numbers. As a result, these hashing algorithms require that a large number of packets be sent in order to account for all possible source and destination ports available along each end-to-end path between any two nodes. For example, in a standard mid-sized to large mesh network where n equals the number of nodes, the hashing algorithms utilized by the existing solutions may require as many as $n^2 \times 1,000$ data packets to be sent in order to discover all possible end-to-end paths between any two nodes. In other words, the existing solutions rely on a randomized approach based on packet entropy and hashing that seeks to determine all possible end-to-end paths between any two nodes by iteratively sending packet after packet to randomly-generated port numbers based on the hashed information. The present methods and systems do not require packet entropy and hashing. The present methods and systems may determine all possible end-to-end paths using a single data packet that is sent by a given endpoint node (e.g., a sending node) to another endpoint node, thereby using as few as n data packets as compared to $n^2 \times 1,000$ data packets required by the existing solutions.

Another improvement provided by the present methods and systems relates to changes in network conditions, such as when nodes within the network go offline or when new nodes are added to the network. Since the existing solutions require that data packets be sent to specific endpoint nodes, each node must be aware of every other node at all times. For example, according to the existing solutions, a controller node/device must keep track of each node's state and provide updates to all of the other nodes routinely as nodes go offline or when new nodes are added to the network. By contrast, the present methods and systems do not require the use of a controller device node. For example, the present methods and systems may use a form of dense mode multicast where a single data packet is sent by a given endpoint node (e.g., a sending node) to a multicast Internet protocol (IP) address used by all nodes in the network. All of the nodes in the network may be configured to listen for packets on the multicast IP address. Therefore, the single packet sent by the endpoint node may be used to account for all possible end-to-end paths between the endpoint node and all of the other nodes in the network. Additionally, the use of a multicast IP address eliminates the need for a controller device/node (e.g., the nodes are not required to be aware of one another).

As discussed herein, the present methods and systems may determine all possible end-to-end paths between nodes in a network using a single data packet that is sent by a given endpoint node (e.g., a sending node) to account for all possible end-to-end paths between the endpoint node and all other nodes in the network. For example, a sending node (e.g., an endpoint node) may determine/generate a network message. The network message may be a data packet for a probe/ping request. The sending node and at least one recipient node (e.g., another endpoint node) may be in communication via a plurality of intermediary nodes within the network. The intermediary nodes may be network switches, load balancers, servers, etc. The sending node may send the network message to a multicast IP address. All of the nodes in the network (e.g., endpoint as well as intermediary nodes) may be configured to listen for (e.g., receive/manipulate) data packets that are directed to the multicast IP address.

Each of the intermediary nodes may be configured to determine one or more downstream paths associated with the multicast IP address and to send one or more copies of the network message to the multicast IP address via the one or more downstream paths. For example, a first intermediary node may be at a given hop between the sending node and the recipient node. The first intermediary node may be in communication with a plurality of other intermediary nodes that are downstream with respect to the first intermediary node. The first intermediary node may receive the network message from the sending node or from another intermediary node that is upstream with respect to the first intermediary node. The first intermediary node may determine that the network message is directed to the multicast IP address. Based on the network message being directed to the multicast IP address, the first intermediary node may determine that a number of copies of the network message are to be sent downstream. For example, all of the intermediary nodes may be configured such that network messages directed to the multicast IP address are caused to be copied and sent downstream. The first intermediary node may determine/generate a number of copies of the network message based on a number of intermediary nodes within the plurality of other intermediary nodes that are downstream with respect to the first intermediary node. Thus, the first intermediary node may determine/generate a number of copies of the network message equal to a number of possible paths from the first intermediary node downstream toward the recipient node. Each of the copies of the network message determined/generated by the first intermediary node may indicate the sending node as the source (e.g., an IP address associated with the sending node). The first intermediary node may send the determined/generated copies of the network message to the multicast IP address via the plurality of other intermediary nodes (e.g., one copy of the network message may be sent via each path downstream toward the recipient node).

The network message—and copies thereof—may traverse the plurality of intermediary nodes in a manner similar to the first intermediary node (e.g., multiple hops may be traversed). The recipient node may receive a number of copies of the network message. For example, the recipient node may receive a number of copies of the network message that corresponds to a number of possible end-to-end paths between the sending node and the recipient node. Each particular copy of the network message may identify a given intermediary node that determined/generated the particular copy. Each particular copy of the network message may indicate the sending node as the source (e.g., an IP address associated with the sending node). The recipient node may reply to each of the copies of the network message. For example, the recipient node may determine/generate a reply to each of the copies of the network message and send each of the replies to the sending node via the plurality of intermediary nodes. The sending node may receive each of the replies. The sending node may provide the replies to a collector module. The sending node may initiate the process discussed above on a periodic basis and provide the corresponding replies to the collector module in real-time, at a set interval, pursuant to a reporting schedule, etc. The sending node may provide the corresponding replies directly to the collector module, or the sending node may provide a summary report to the collector module. The collector module may store the corresponding replies received from the sending nodes. For example, the collector module may store a time series history of all groups of corresponding replies and/or summary reports received from the sending node.

The collector module may be a separate computing device in the network or it may be resident at any of the nodes in the network. For example, the collector module may be a server that is in communication with the sending node, the recipient node, one or more of the plurality of intermediary nodes, a combination thereof, and/or the like. As another example, the collector module may be a component (e.g., software and/or hardware) that is resident at the sending node, the recipient node, one or more of the plurality of intermediary nodes, a combination thereof, and/or the like. Other example configurations for the collector module are possible, as one skilled in the art can appreciate.

The collector module may use the replies and/or summary reports for network analytics, network monitoring, machine learning, and the like. For example, the collector module may determine a path for communications between the sending node and the recipient node, one or more network conditions, a combination thereof, and/or the like. For example, the collector module may determine at least one of an amount of latency associated with an intermediary node of the plurality of intermediary nodes, a failure of an intermediary node of the plurality of intermediary nodes, or an amount of available bandwidth of an intermediary node of the plurality of intermediary nodes. For example, the collector module may determine an amount of latency associated with an intermediary node based on a timestamp of a particular reply sent (e.g., forwarded) by the intermediary node and a time associated with the sending node receiving that reply (e.g., indicating a latency associated with the path comprising that intermediary node and the sending node). As another example, the collector module may determine a failure of an intermediary node and/or packet loss associated therewith based on a number of the replies not corresponding to a known number of end-to-end paths between the sending node and the recipient node (e.g., the number of replies being less than the known number of end-to-end paths, thereby indicating a failure of an intermediary node along a path). As another example, the collector module may determine a failure of the recipient node based on a sudden drop in a reply rate and/or a number of total replies received from the recipient node not corresponding to a known number of end-to-end paths between the sending node and the recipient node.

As another example, the collector module may determine a best end-to-end path between the sending node and the recipient node, and the collector module may cause the sending node and the recipient node to communicate via the best end-to-end path. As a further example, the collector module may determine when the replies and/or summary reports are indicative of an unexpected change in the network. The unexpected change may be a result of a surge in network traffic, a failure of a network component(s), a failure of an upgrade process, and/or the like. The collector module may determine that a remedial action is required in response to the unexpected change. For example, the collector module may cause additional nodes to go online to handle a surge in network traffic or a failure of a network component(s). As another example, the collector module may cause an upgrade process to be rolled back and/or scheduled for completion at a later time that is likely to be less impactful on network performance. Other example remedial actions are possible.

Turning now to FIG. 1, an example system 100 is shown. The system 100 may comprise a plurality of endpoint nodes, such as N01, N11, N12, etc., as well as a plurality of intermediary nodes in communication via a network 106. The network 106 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent by or to any of the plurality of endpoint nodes and the plurality of intermediary nodes via a variety of transmission paths of the network 106, including wireless paths (e.g., satellite paths, Wi-Fi paths, cellular paths, etc.) and terrestrial paths (e.g., wired paths, a direct feed source via a direct line, etc.). The plurality of endpoint nodes, the plurality of intermediary nodes, and the network 106 may be configured to operate in or more communication modes, such as Protocol Independent Multicast Dense mode. The plurality of endpoint nodes and the plurality of intermediary nodes may be configured to listen for (e.g., receive/manipulate) data packets within the network 106 that are directed to a multicast internet protocol (IP) address.

The plurality of intermediary nodes may comprise one or more management switches, such as MGT-01, MGT-11, MGT-12, etc.; one or more leaf switches, such as L01-L04, L11-L14, etc.; one or more spine switches, such as S01-S08; and/or one or more aggregation spine switches, such as AS01-AS04. While the plurality of intermediary nodes are described herein as being management switches, leaf switches, spine switches, or aggregation spine switches, it is to be understood that the plurality intermediary nodes may include any suitable computing device for sending, receiving, and/or generating network communications. For example, the plurality intermediary nodes may include one or more edge servers, central office servers, headends, node servers, a combination thereof, and/or the like. The plurality of endpoint nodes may include any suitable computing device for sending, receiving, and/or generating network communications. For example, the plurality of endpoint nodes may be Internet-capable devices (e.g., Internet of things (IoT) devices) that have limited computing and/or energy resources, such as smart devices, sensors, light bulbs, cameras, actuators, game controllers, audio equipment, one or more thereof, and/or the like. As another example, the plurality of endpoint nodes may be computing devices, mobile computing devices (e.g., laptops, smartphones, tablets, etc.), set-top boxes, appliances, one or more thereof, and/or the like.

The network 106 may include a number of possible end-to-end paths between two particular endpoint nodes of the plurality of endpoint nodes. An end-to-end path may comprise a number of intermediary nodes between the two particular endpoint nodes (e.g., a number of "hops"). An end-to-end path may be considered an "equal cost path" with respect to another end-to-end path when the two paths comprise a same number of intermediary nodes between the two particular endpoint nodes (e.g., an equal number of "hops") and/or when the two paths comprise a same amount of time for traversal (e.g., from one endpoint node to the other endpoint node).

For example, as shown in FIG. 1, a total of 64 end-to-end paths exist between the endpoint node N01 and the endpoint node N11. According to the hashing algorithms utilized by the existing solutions described above, each of the endpoint nodes N01 and N11 (e.g., sending nodes) may need to send upwards of $n^2 \times 1{,}000$ data packets, where n equals the number of nodes in the system 100, in order to discover all possible end-to-end paths between any each other. In contrast to the existing solutions, the system 100 may be configured such that a single network message (e.g., a data packet) sent by the endpoint node N01 may be used to determine the 64 end-to-end paths between the endpoint node N01 and the endpoint node N11. For example, the endpoint node N01 may send a network message to the multicast IP address via the network 106. The network message may be a ping/probe packet directed to the multicast IP address. The network message may propagate throughout the network 106 via at least one of the intermediary nodes.

Returning to FIG. 1, the intermediary node MGT-01 may receive the network message sent by the endpoint node N01. The intermediary node MGT-01 may determine that the network message is directed to the multicast IP address. Based on the network message being directed to the multicast IP address, the intermediary node MGT-01 may determine that a number of copies of the network message are to be sent downstream. For example, all of the intermediary nodes of the system 100 may be configured according to a network protocol, which is described further herein, such that network messages directed to the multicast IP address are caused to be copied and sent downstream. While the description herein uses the phrase "copies of the network message," it is to be understood that each "copy" of the network message sent by the endpoint node N01 may not be a direct one-to-one replication. Each "copy" of the network message may be a new network message/packet and/or any other message/packet capable of being generated/sent. Each "copy" may contain one or more portions of the network message sent by the endpoint node N01. Each "copy" of a preceding "copy" of the network message may contain one or more portions of the original network message sent by the endpoint node N01 and/or one or more portions of the preceding "copy" generated by a given intermediary node.

As shown in FIG. 1, the intermediary node MGT-01 may be in communication with the intermediary node L01 and the intermediary node L02. The intermediary node MGT-01 may determine/generate two copies of the network message based on the intermediary node MGT-01 being in communication with the intermediary node L01 and the intermediary node L02. Each of the copies of the network message determined/generated by the intermediary node MGT-01 may indicate the endpoint node N01 as the source (e.g., an IP address associated with the endpoint node N01). The intermediary node MGT-01 may send the determined/generated copies of the network message to the multicast IP address via the network 106.

The intermediary nodes L01 and L02 may each receive a corresponding copy of the network message from the intermediary node MGT-01 via the multicast IP address and the network 106. As shown in FIG. 1, the intermediary nodes L01 and L02 may each be in communication with the intermediary nodes S01 and S02. The intermediary nodes L01 and L02 may each determine/generate 2 copies of the network message based on each being in communication with the intermediary nodes S01 and S02. Each of the intermediary nodes S01 and S02 may receive 2 copies of the network message—one copy from the intermediary node L01 and another copy from the intermediary node L02. The intermediary nodes S01 and S02 may determine/generate copies of the network message and send the copies in a similar manner as the intermediary nodes L01 and L02. For example, the intermediary node S01 may determine/generate 2 copies of the 2 network messages received from the intermediary node L01 and determine/generate 2 copies of the 2 network messages received from the intermediary node L02. Similarly, the intermediary node S02 may determine/generate 2 copies of the 2 network messages received from the intermediary node L01 and determine/generate 2 copies of the 2 network messages received from the intermediary node L02. As shown in FIG. 1, the intermediary nodes S01 and S02 may determine/generate and send a total of 16 copies of the network message to the intermediary nodes AS01-AS04, each of which may receive 4 copies of the network message.

Each of the intermediary nodes AS01-AS04 may determine/generate copies of the network message and send the copies to the intermediary nodes S07 and S08. For example, the intermediary nodes AS01-AS04 may each determine/generate 2 copies of the network message based on each being in communication with the intermediary nodes S07 and S08. For example, the intermediary node AS01 may determine/generate 2 copies of the 2 network messages received from the intermediary node S01 and determine/generate 2 copies of the 2 network messages received from the intermediary node S02. Similarly, each of the intermediary node AS02-AS04 may determine/generate 2 copies of the 2 network messages received from the intermediary node S01 and determine/generate 2 copies of the 2 network messages received from the intermediary node S02. As shown in FIG. 1, the intermediary nodes AS01-AS04 may send a total of 32 copies of the network message to the intermediary nodes S07 and S08, and the intermediary nodes S07 and S08 may each receive 16 copies of the network message (e.g., 4 copies from each of the intermediary nodes AS01-AS04).

As shown in FIG. 1, the intermediary nodes AS01-AS04 may not send copies of the network message to the intermediary nodes S03-S06. This may be a result of periodic network pruning performed by the network 106. For example, the intermediary nodes AS01-AS04 may have previously determined that each of the intermediary nodes S03-S06 are not in communication with any endpoint node. For example, the intermediary nodes AS01-AS04 may have previously sent network messages (e.g., any type of network communication) to the intermediary nodes S03-S06, and the intermediary nodes S03-S06 may have provided a response(s) indicating that each of the intermediary nodes S03-S06 are not in communication with any endpoint node. Based on the indication from the intermediary nodes S03-S06, the intermediary nodes AS01-AS04 may not send copies of the network message to the intermediary nodes S03-S06. The intermediary nodes AS01-AS04 may determine whether any of the intermediary nodes S03-S06 are in communication with any endpoint node on a periodic basis, pursuant to a schedule, etc. As an example, the intermediary node S03 may be caused to be in communication with the endpoint node N01 (e.g., not shown) at a later time. The intermediary node S03 may send a network message (e.g., any type of network communication) to at least one of the intermediary nodes in the network 106 indicating that the intermediary node S03 is now in communication with the endpoint node N01. As a result, the intermediary nodes AS01-AS04 may begin sending to the intermediary node S03 copies of network messages associated with the endpoint node N01 that are received by the intermediary nodes AS01-AS04 after being notified that the intermediary node S03 is in communication with the endpoint node N01.

Each of the intermediary nodes S07 and S08 may determine/generate copies of the network message and send the copies to the intermediary nodes L11 and L12. For example, the intermediary nodes S07 and S08 may each determine/generate 2 copies of their corresponding 16 copies of the network message based on each being in communication with the intermediary nodes L11 and L12. As shown in FIG. 1, the intermediary nodes S07 and S08 may send a total of 64 copies of the network message to the intermediary nodes L11 and L12, and each of the intermediary nodes L11 and L12 may receive 32 copies of the network message (e.g., 16 copies from each of the intermediary nodes S07 and S08).

Similarly, each of the intermediary nodes S07 and S08 may determine/generate copies of the network message and send the copies to the intermediary nodes L13 and L14. For example, the intermediary nodes S07 and S08 may each determine/generate 2 copies of their corresponding 16 copies of the network message based on each being in communication with the intermediary nodes L13 and L14. As shown in FIG. 1, the intermediary nodes S07 and S08 may send a total of 64 copies of the network message to the intermediary nodes L13 and L14, and each of the intermediary nodes L13 and L14 may receive 32 copies of the network message (e.g., 16 copies from each of the intermediary nodes S07 and S08).

Each of the intermediary nodes L11 and L12 may determine/generate a copy of their corresponding 32 copies of the network message based on each being in communication with the intermediary node MGT-11. The intermediary nodes L11 and L12 may send the copies of the network message to the intermediary node MGT-11. As shown in FIG. 1, the intermediary nodes L11 and L12 may send a total of 64 copies of the network message to the intermediary node MGT-11, and the intermediary node MGT-11 may receive 64 copies of the network message (e.g., 32 copies from each of the intermediary nodes L11 and L12).

Similarly, each of the intermediary nodes L11 and L12 may determine/generate a copy of their corresponding 32 copies of the network message based on each being in communication with the intermediary node MGT-12. The intermediary nodes L11 and L12 may send the copies of the network message to the intermediary node MGT-12. As shown in FIG. 1, the intermediary nodes L11 and L12 may send a total of 64 copies of the network message to the intermediary node MGT-12, and the intermediary node MGT-12 may receive 64 copies of the network message (e.g., 32 copies from each of the intermediary nodes L11 and L12).

The intermediary node MGT-11 may receive the 64 copies of the network message (e.g., 32 copies from each of the intermediary nodes L11 and L12). The intermediary node MGT-11 may determine it is in communication with the endpoint node N11. The intermediary node MGT-11 may determine/generate a copy of each of the 64 copies of the network message based on being in communication with the endpoint node N11, and the intermediary node MGT-11 may send the 64 copies to the endpoint node N11. Similarly, the intermediary node MGT-12 may receive the 64 copies of the network message (e.g., 32 copies from each of the intermediary nodes L11 and L12). The intermediary node MGT-12 may determine it is in communication with the endpoint node N12. The intermediary node MGT-12 may determine/generate a copy of each of the 64 copies of the network message based on being in communication with the endpoint node N12, and the intermediary node MGT-12 may send the 64 copies to the endpoint node N12.

Each of the endpoint nodes N11 and N12 may receive 64 copies of the network message. For example, the endpoint node N11 may receive the 64 copies from the intermediary node MGT-11, and the endpoint node N12 may receive the 64 copies from the intermediary node MGT-12. Each copy of the network message received by the endpoint node N11 may therefore correspond to a unique end-to-end path between the endpoint node N01 and the endpoint node N11. Each copy of the network message received by the endpoint node N12 may therefore correspond to a unique end-to-end path between the endpoint node N01 and the endpoint node N12.

Each of the endpoint nodes N11 and N12 may send a reply to each of the 64 copies of the network message. For example, the endpoint node N11 may send a reply to the 64 copies received from the intermediary node MGT-11, and the endpoint node N12 may send a reply to the 64 copies received from the intermediary node MGT-12. Each of the replies sent by the endpoint nodes N11 and N12 may comprise a unicast reply packet directed to the endpoint node N01. When sending the replies, each of the endpoint nodes N11 and N12 may add a timestamp to each reply. For example, the timestamp may correspond to a time at which the endpoint node N11 or N12 (as the case may be) received the copy of the network message that corresponds to the particular reply.

As discussed herein, the copies of the network message determined/generated by the intermediary nodes may indicate the endpoint node N01 as the source (e.g., an IP address associated with the endpoint node N01). The replies sent by the endpoint nodes N11 and N12 may be directed to the endpoint node N01 based on the endpoint node N01 being indicated as the source in each copy of the network message received by the endpoint nodes N11 and N12. The endpoint node N01 may receive 64 replies from the endpoint node N11 and 64 replies from the endpoint node N12. The endpoint node N01 may provide the replies to a collector module. As another example, each of the endpoint nodes N11 and N12 may send the replies directly to the collector module. As a further example, each of the endpoint nodes N11 and N12 may send the replies directly to the endpoint node N01 and corresponding copies of the replies to the collector module—or vice-versa. The endpoint node N01 may initiate the process discussed above on a periodic basis and provide the corresponding replies to the collector module in real-time, at a set interval, pursuant to a reporting schedule, etc. The endpoint node N01 may provide the corresponding replies directly to the collector module, or the endpoint node N01 may provide a summary report to the collector module. The collector module may store the corresponding replies received from the endpoint node N01. For example, the collector module may store a time series history of all groups of corresponding replies and/or summary reports received from the endpoint node N01.

The collector module may be a separate computing device in the network 106 or it may be resident at any of the endpoint nodes or intermediary nodes in the network 106. For example, the collector module may be a separate computing device in the network 106, such as a server, that is in communication with the endpoint node N01, the endpoint node N11, the endpoint node N12, one or more of the intermediary nodes, a combination thereof, and/or the like. As another example, the collector module may be a component (e.g., software and/or hardware) that is resident at the endpoint node N01, the endpoint node N11, the endpoint node N12, one or more of the intermediary nodes, a combination thereof, and/or the like. Other example configurations for the collector module are possible, as one skilled in the art can appreciate.

The collector module may analyze each of the replies to determine a path for communications between the endpoint node N01 and the endpoint node N11 and/or N12. The collector module may analyze each of the replies to determine one or more network conditions (e.g., latency, node failure, packet loss, etc.); to perform network analytics; to perform network monitoring, to conduct machine learning, and the like. For example, the collector module may determine a latency associated with an intermediary node based on the timestamp of a particular reply and a time associated with the endpoint node N01 receiving the reply. As another example, the collector module may determine a failure of an intermediary node and/or packet loss based on a number of the replies not corresponding to a known number of end-to-end paths between the endpoint node N01 and the endpoint node N11 and/or N12 (e.g., the number of replies being less than the known number of end-to-end paths, thereby indicating a failure of an intermediary node along a path). As another example, the collector module may determine a failure of the endpoint node N11 and/or N12 based on a sudden drop in a reply rate and/or a number of total replies received not corresponding to a known number of end-to-end paths between the endpoint node N01 and the endpoint node N11 and/or N12.

Based on the one or more network conditions, the collector module may determine a best end-to-end path between the endpoint node N01 and the endpoint node N11 and/or N12, and the collector module may cause the endpoint node N01 and the endpoint node N11 and/or N12 to communicate via the best end-to-end path. For example, the collector module may determine that the endpoint node N11 did not sent a reply corresponding to end-to-end paths associated with the intermediary node S01, and the collector module may send an instruction to the endpoint node N01 and or the endpoint node N11 that causes each to communicate with the other using an end-to-end path that is not associated with the intermediary node S01. As a further example, the collector module may determine when the replies and/or summary reports are indicative of an unexpected change in the network. As discussed herein, the collector module may store a time series history of all groups of corresponding replies and/or summary reports received from the endpoint node N01. The collector module may use the time series history and machine learning, prediction models, etc., to determine (e.g., detect/derive) the unexpected change—or network conditions indicative of a forthcoming unexpected change. The unexpected change may be a result of a surge in network traffic, a failure of a network component(s), a failure of an upgrade process, and/or the like. The collector module may determine that a remedial action is required in response to the unexpected change—or a determination of a forthcoming unexpected change. For example, the collector module may cause additional nodes to go online to handle a surge in network traffic or a failure of a network component(s). As another example, the collector module may cause an upgrade process to be rolled back and/or scheduled for completion at a later time that is likely to be less impactful on network performance. Other example remedial actions are possible. It is to be understood that the aforementioned examples of actions taken by the collector module are exemplary only and that other possible examples are contemplated herein.

As discussed above, all of the intermediary nodes of the system 100 may be configured according to a network protocol. The network protocol may define how network messages directed to the multicast IP address are to be processed by the intermediary nodes. The network protocol may be a variant of the Protocol-Independent Multicast Dense Mode (PIM-DM). For example, the network protocol may indicate that incoming network messages (or copies thereof) addressed to the multicast IP address that are received by any of the intermediary nodes are not to be sent to any another intermediary nodes using a same interface and/or port number that was used to receive the network message. For example, the intermediary node S01 may be in communication with the intermediary node L01 via a first interface of a plurality of interfaces (e.g., network interfaces) and/or a first port number of a plurality of port numbers (e.g., network communication ports). The intermediary node S01 may receive a copy of the network message, which may be addressed to the multicast IP address, from the intermediary node L01 via the first interface and/or the first port number. Based on the network protocol, the intermediary node S01 may not send a "new" copy of the copy of the network message received from the intermediary node L01 back to the intermediary node L01 (e.g., thereby avoiding a feedback loop). This is because the network protocol may prevent the intermediary node S01 from using the first interface and/or the first port number to send a "new" copy—or copies—of the copy of the network message received from the intermediary node L01. While FIG. 1 does not show either of the intermediary nodes L03 or L04 receiving copies of the network message, either of the intermediary nodes S01 or S02 may send such copies of the network message to the intermediary nodes L03 or L04. However, similar to example regarding the intermediary node S01 described above, the network protocol may prevent the intermediary nodes L03 and L04 from sending "new" copies of the network message back to either of the intermediary nodes S01 or S02.

The intermediary node S01 may have previously determined that each of the intermediary nodes L03 and L04 are not in communication with any endpoint node. For example, the intermediary node S01 may have previously sent network messages (e.g., any type of network communication) to the intermediary nodes L03 and L04, and the intermediary nodes L03 and L04 may have provided a response(s) indicating that each of the intermediary nodes L03 and L04 are not in communication with any endpoint node. Based on the indication from the intermediary nodes L03 and L04, the intermediary node S01 may not send copies of the network message to the intermediary nodes L03 and L04. The intermediary node S01 may determine whether any of the intermediary nodes L03 and L04 are in communication with any endpoint node on a periodic basis, pursuant to a schedule, etc. As an example, the intermediary node L03 may be caused to be in communication with the endpoint node N01 (e.g., not shown) at a later time. The intermediary node L03 may send a network message (e.g., any type of network communication) to at least one of the intermediary nodes in the network 106 indicating that the intermediary node L03 is now in communication with the endpoint node N01. As a result, the intermediary node S01 may begin sending to the intermediary node L03 copies of network messages associated with the endpoint node N01 that are received by the intermediary nodes S01 after being notified that the intermediary node L03 is in communication with the endpoint node N01.

As discussed herein, the network message initially determined/generated by the endpoint node N01 may be a ping/probe packet directed to the multicast IP address. The network protocol may indicate that ping/probe packets directed to the multicast IP address are to be copied by each particular intermediary node a number of times corresponding to a number of downstream intermediary nodes in communication with that particular intermediary node. For example, the intermediary node MGT-01 may determine/generate 2 copies of the network message based on the intermediary node MGT-01 being in communication with two downstream intermediary nodes, L01 and L02. As another example, the network protocol may indicate that all ping/probe packets are to be copied and sent downstream, regardless of whether duplicates of a particular ping/probe packet are received. For example, the intermediary node S01 may receive two copies of the network message (e.g., a ping/probe packet): a first copy from the intermediary node L01 and a second copy from the intermediary node L02. Based on the network protocol, the intermediary node S01 may determine/generate a copy of each of the copies of the network message received from the intermediary nodes L01 and L02. The network protocol may therefore ensure that the network message is copied a number of times corresponding to a number of end-to-end paths between the endpoint node N01 and the endpoint node N11 and/or N11 (e.g., 64 total paths/copies).

Each of the endpoint nodes of the system 100 may be configured according to the network protocol. The network protocol may define how network messages received by the endpoint nodes that are directed to the multicast IP address are to be processed. For example, the network protocol may cause the endpoint nodes to reply to incoming network messages (or copies thereof) that are addressed to the multicast IP address. The network protocol may indicate that such replies sent by the endpoint nodes are to be addressed to a source associated with the incoming network message(s) (or copies thereof). For example, the network message initially determined/generated by the endpoint node N01 may be a ping/probe packet directed to the multicast IP address, and the endpoint node N11 and/or N12 may receive a plurality of copies of the ping/probe packet (e.g., generated/sent by the intermediary nodes corresponding to each end-to-end path). The plurality of copies of the ping/probe packet may be indicative of the endpoint node N01 as the source. The endpoint node N11 and/or N12 may reply to each of the plurality of copies of the ping/probe packet according to the network protocol. For example, as discussed herein, the endpoint node N11 and/or N12 may send 64 replies (e.g., a reply to each of the 64 copies of the ping/probe packet) to the endpoint node N01 (e.g., addressed to the endpoint node N01).

Figure 2A:
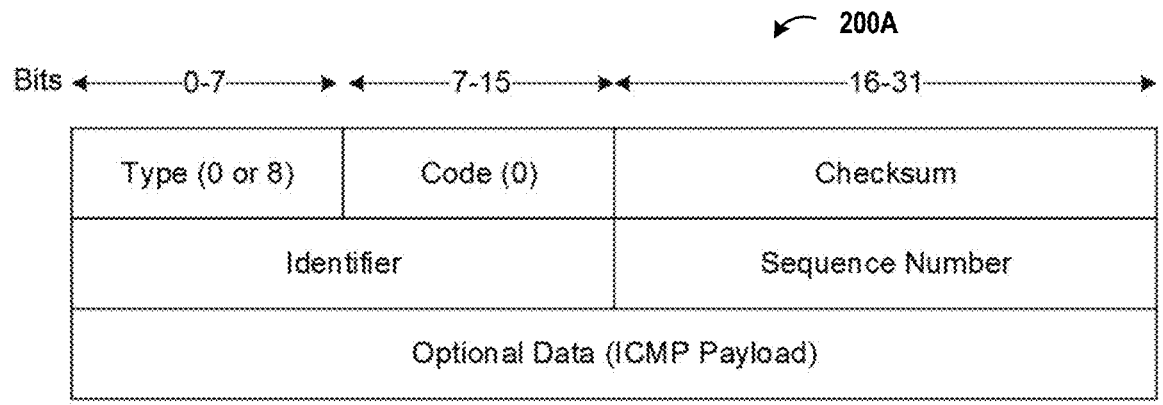
FIGS. 2A and 2B show example packet structures.
Figure 2B:
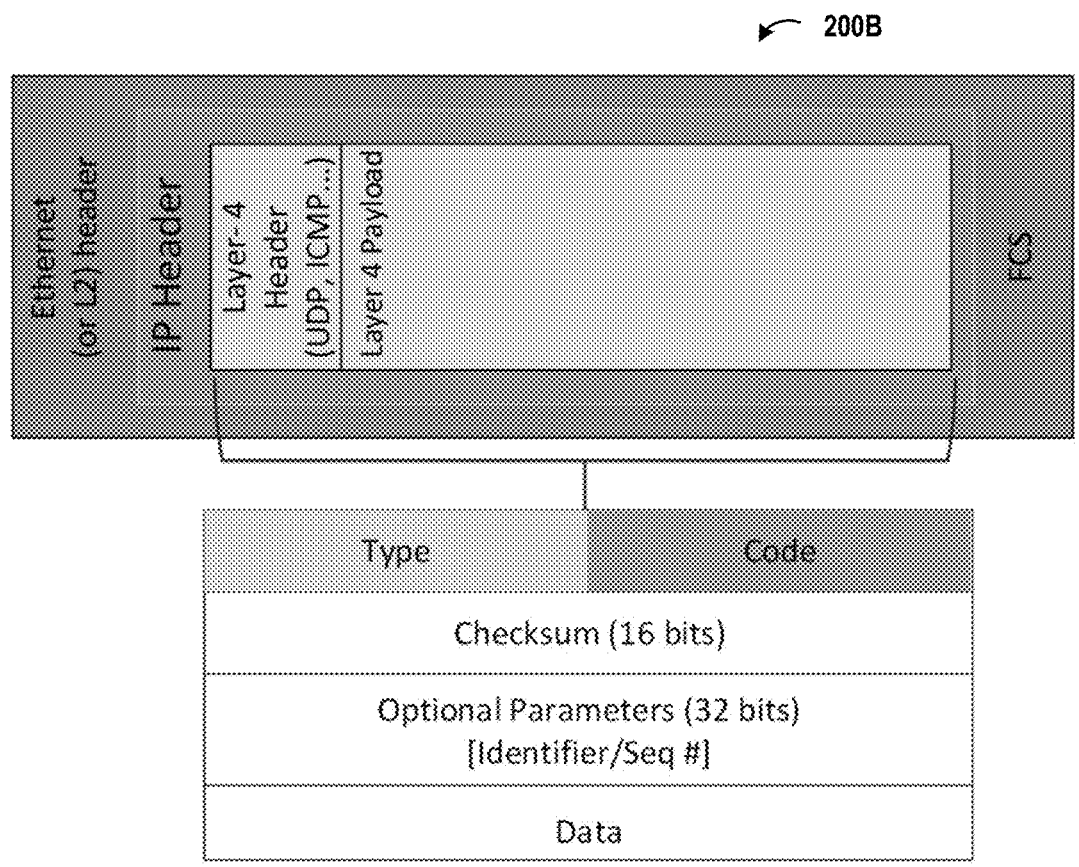

FIGS. 2A and 2B show example packet structures of network messages as described herein. It is to be understood that the packet structures shown in FIGS. 2A and 2B are exemplary only. Additional packet structures may be used. As discussed herein, an endpoint node, such as the endpoint node N01 of the system 100, may send a network message to a multicast IP address. The network message may comprise a ping/probe packet, and FIG. 2A shows an example packet structure 200A for the ping/probe packet, copies of the ping/probe packet, and replies to the ping/probe packet. The ping/probe packet may be structured according to the Internet Control Message Protocol (ICMP), the Transmission Control Protocol (TCP), the User Datagram Protocol (UDP), and/or the like. As shown in FIG. 2A, the ping/probe packet may comprise an identifier and a sequence number.

The identifier of the ping/probe packet may be set in the initial network message determined/generated by the sending endpoint node (e.g., the endpoint node N01). The identifier may be echoed back in replies to the network message, such as those sent by the endpoint node N11 and/or N12. The identifier may enable the system 100 (e.g., the collector module) to associate the network message (and copies thereof) with corresponding replies. The sequence number of the ping/probe packet may be incremented as the network message is copied by the intermediary nodes. For example, the sequence number for the network message initially determined/generated by the sending endpoint node (e.g., the endpoint node N01) may be set to 1, and the sequence number may be incremented by 1 each time the network message (or a copy thereof) is copied by an intermediary node.

As shown in FIG. 2A, the ping/probe packet may have a "Type" of either 0 or 8. The initial network message determined/generated by the sending endpoint node (and copies thereof) may be type 8, and each reply to the network message or to a copy of the network message may be type 0. As shown in FIG. 2A, the ping/probe packet may have a "Code" field. The Code field for the initial network message (and copies of thereof) as well as each reply to the network message or to a copy of the network message may be set to 0 for both (e.g., indicating that the Code field is empty/not used). In other examples, the Code field for the initial network message (and copies of thereof) as well as each reply to the network message or to a copy of the network message may include metadata or other network information. As shown in FIG. 2A, the ping/probe packet may have a "Checksum" value, which may be used to determine data integrity for the particular network message (or a copy thereof).

The initial network message determined/generated by the sending endpoint node (and copies thereof) may comprise a node identifier corresponding to the sending endpoint node and a destination IP address corresponding to the multicast IP address described herein. Each reply to the network message, or to a copy of the network message, may comprise a node identifier corresponding to the recipient node (e.g., the endpoint node N11 and/or N12) and a destination IP address corresponding to the sending endpoint node (e.g., the IP address for the endpoint node N01). A node identifier for any of the nodes shown in FIG. 1 may be any value that uniquely identifies a particular node from every other node in the network 106. For example, a node identifier may be an IP address, a hostname, a hash value, a string of characters, a serial number, a media access control address (MAC address), a combination thereof, and/or the like.

As discussed herein with respect to FIG. 1, when sending the replies to the copies of the network message, each of the endpoint nodes N11 and N12 may add a timestamp to each reply. For example, the timestamp may correspond to a time at which the endpoint node N11 or N12 (as the case may be) received the copy of the network message that corresponds to the particular reply. As shown in FIG. 2A, the ping/probe packet may comprise an "ICMP Payload." The ICMP Payload contain metadata or other information relating to one or more intermediary nodes, endpoint nodes, or sending nodes. The ICMP Payload for each reply may comprise a timestamp that corresponds to a time at which the responding endpoint node received the copy of the network message. Each copy of the network message sent by each particular intermediary node may include metadata in the ICMP Payload relating to a particular intermediary node, one or more other intermediary nodes, endpoint nodes, or sending nodes. The metadata included in the ICMP Payload may include a corresponding node identifier; a timestamp(s); an amount of bandwidth; an amount of processing resources available/occupied; operating system (OS) information; a node cluster identifier; a location identifier; an indication of a maintenance schedule (e.g., a timeframe during which the node will be offline/inaccessible); a combination thereof, and/or the like. Each node in the system 100 may append the ICMP Payload of the network message—or a copy thereof. For example, any of the intermediary nodes may append the ICMP Payload of the network message—or a copy thereof as the case may be. An endpoint node (e.g., N11) that receives the network message and copies thereof may append metadata to each of the replies sent to the corresponding sending node. The ICMP Payload may therefore be used to derive a metrics and statistics relating to any of the intermediary nodes, endpoint nodes, sending nodes, and/or the network overall.

The ping/probe packet shown in FIG. 2A may be included within a payload of an IP packet. For example, as shown in FIG. 2B, an example packet structure of an IP packet 200B includes the ping/probe packet shown in FIG. 2A as payload within the IP packet 200B.

Figure 3:
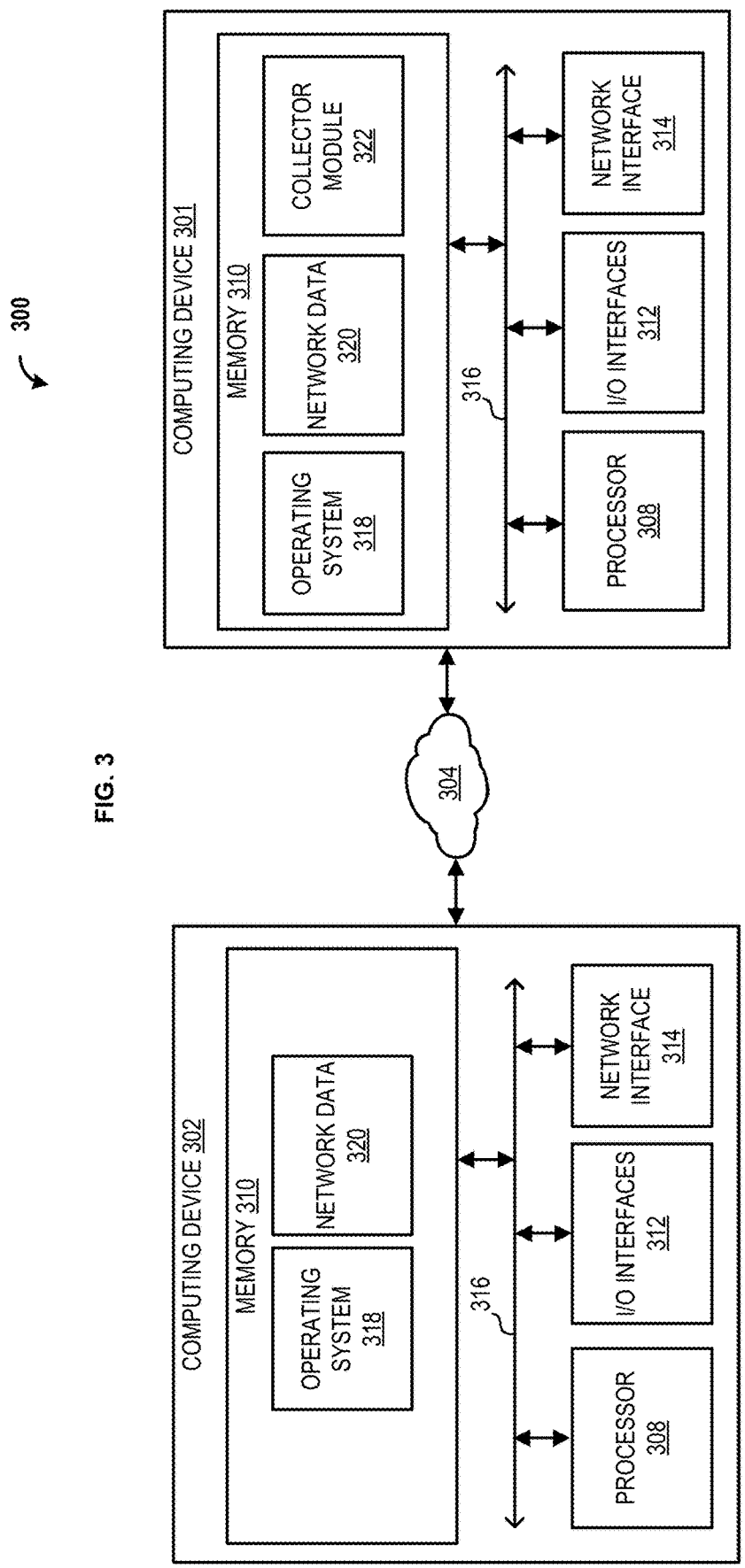
FIG. 3 shows an example system.

As discussed herein, the present methods and systems may be computer-implemented. FIG. 3 shows a block diagram depicting an example system 300 comprising non-limiting examples of a computing device 301 and a server 302 connected through a network 304, such as the network 106. The computing device 301 and/or the server 302 may be any one of the devices shown in FIG. 1. In an aspect, some or all steps of any described method herein may be performed using the computing device 301 and/or the server 302. The computing device 301 can comprise a collector module 322, such as the collector module described herein with respect to FIG. 1. The server 302 can comprise one or multiple computers configured to store network data 320, such as network messages, network condition data, and/or the like. Multiple servers 302 can communicate with the computing device 301 via the through the network 304.

The computing device 301 and the server 302 may each be a digital computer that, in terms of hardware architecture, generally includes a processor 308, memory system 310, input/output (I/O) interfaces 312, and network interfaces 314. These components (308, 310, 312, and 314) are communicatively coupled via a local interface 316. The local interface 316 can be, for example, but not limited to, one or more buses or other wired or wireless connections, as is known in the art. The local interface 316 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 308 can be a hardware device for executing software, particularly that stored in memory system 310. The processor 308 can be any custom made or commercially available processor, a central processing unit (CPU), an auxiliary processor among several processors associated with the computing device 301 and the server 302, a semiconductor-based microprocessor (in the form of a microchip or chip set), or generally any device for executing software instructions. When the computing device 301 and/or the server 302 is in operation, the processor 308 can be configured to execute software stored within the memory system 310, to communicate data to and from the memory system 310, and to generally control operations of the computing device 301 and the server 302 pursuant to the software.

The I/O interfaces 312 can be used to receive user input from, and/or for providing system output to, one or more devices or components. User input can be provided via, for example, a keyboard and/or a mouse. System output can be provided via a display device and a printer (not shown). I/O interfaces 312 can include, for example, a serial port, a parallel port, a Small Computer System Interface (SCSI), an infrared (IR) interface, a radio frequency (RF) interface, and/or a universal serial bus (USB) interface.

The network interface 314 can be used to transmit and receive from the computing device 301 and/or the server 302 on the network 304. The network interface 314 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 314 may include address, control, and/or data connections to enable appropriate communications on the network 304.

The memory system 310 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 310 may incorporate electronic, magnetic, optical, and/or other types of storage media. Note that the memory system 310 can have a distributed architecture, where various components are situated remote from one another, but can be accessed by the processor 308.

The software in memory system 310 may include one or more software programs, each of which comprises an ordered listing of executable instructions for implementing logical functions. In the example of FIG. 3, the software in the memory system 310 of the computing device 301 can comprise a suitable operating system (O/S) 318. In the example of FIG. 3, the software in the memory system 310 of the server 302 can comprise, the network data 320, and a suitable operating system (O/S) 318. The operating system 318 essentially controls the execution of other computer programs and provides scheduling, input-output control, file and data management, memory management, and communication control and related services.

For purposes of illustration, application programs and other executable program components such as the operating system 318 are illustrated herein as discrete blocks, although it is recognized that such programs and components can reside at various times in different storage components of the computing device 301 and/or the server 302. An implementation of the collector module 322 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Turning now to FIG. 4, a flowchart of an example method 400 is shown. The method 400 may be used for path determination in networks having multiple end-to-end paths between nodes, such as the network 106 of the system 100. The method 400 may be performed in whole or in part by a single computing device, a plurality of computing devices, and the like. For example, any of the endpoint nodes N01, N11, or N12 of the system 100 may be configured to perform the method 400.

At step 410, a sending node may determine/generate a network message. The sending node may be an endpoint node, such as the endpoint nodes N01, N11, or N12 of the system 100. The network message may comprise a ping/probe packet. The sending node and a recipient node may be in communication via a plurality of intermediary nodes. The recipient node may comprise another endpoint node. The plurality of intermediary nodes may be any of the intermediary nodes of the system 100.

At step 420, the sending node may send the network message. For example, the sending node may send the network message to a multicast internet protocol (IP) address. Each of the endpoint nodes and the plurality of intermediary nodes may be configured to listen for (e.g., receive/manipulate) data packets that are directed to the multicast IP address. Each of the plurality of intermediary nodes may be configured to determine one or more downstream paths (e.g., end-to-end paths) based on the network message and/or the multicast IP address. Each downstream path of the one or more downstream paths may comprise an "equal cost" path with respect to the sending node and the recipient node based on a number of intermediary nodes associated with each downstream path. Each of the plurality of intermediary nodes may be configured to determine/generate and subsequently send one or more copies of the network message. For example, each of the plurality of intermediary nodes may be configured to determine/generate and subsequently send the one or more copies of the network message to the multicast IP address. Alternatively, or in addition, each of the plurality of intermediary nodes may be configured to determine/generate and subsequently send the one or more copies of the network message via each of the one or more downstream paths. Each copy of the one or more copies of the network message may comprise a node identifier associated with a particular intermediary node of the plurality of intermediary nodes that determined/generated the copy and a destination IP address comprising the multicast IP address. The node identifier may be any value that uniquely identifies a particular node from every other node in the network. For example, the node identifier may be an IP address, a hostname, a hash value, a string of characters, a serial number, a media access control address (MAC address), a combination thereof, and/or the like. The recipient node may receive a number of copies of the network message from the plurality of intermediary nodes. The number of copies of the network message may correspond to a plurality of unique end-to-end paths with respect to the sending node and the recipient node.

At step 430, the sending node may receive a plurality of replies to the network message. The sending node may receive the plurality of replies to the network message from the recipient node. The plurality of replies may be associated with the plurality of unique end-to-end paths with respect to the sending node and the recipient node. Each reply of the plurality of replies may correspond to a unique downstream path comprising at least one intermediary node of the plurality of intermediary nodes, the sending node, and the recipient node. At step 440, the sending node may determine a first end-to-end path for communication between the sending node and the recipient node. For example, the sending node may determine the first end-to-end path for communication based on the plurality of replies.

The sending node may send the plurality of replies to a collector module. The collector module may be resident at the sending node or at another device/node associated with the network. The collector module may determine the first end-to-end path of the plurality of unique end-to-end paths. For example, the collector module may determine the first end-to-end path based on the plurality of replies. The collector module may cause the sending node and the recipient node to communicate via the first end-to-end path. As another example, the collector module may determine one or more network conditions based on the plurality of replies. The one or more network conditions may include a latency associated with an intermediary node of the plurality of intermediary nodes. The one or more network conditions may include a failure of an intermediary node of the plurality of intermediary nodes. The one or more network conditions may include an amount of available bandwidth of an intermediary node of the plurality of intermediary nodes. The sending node and/or the collector module may determine the first end-to-end path based on the one or more network conditions.

Turning now to FIG. 5, a flowchart of an example method 500 is shown. The method 500 may be used for path determination in networks having multiple end-to-end paths between nodes, such as the network 106 of the system 100. The method 500 may be performed in whole or in part by a single computing device, a plurality of computing devices, and the like. For example, any of the endpoint nodes N01, N11, or N12 of the system 100 may be configured to perform the method 500.

A sending node may determine/generate a network message. The sending node may be an endpoint node, such as the endpoint nodes N01, N11, or N12 of the system 100. The network message may comprise a ping/probe packet. The sending node and a recipient node may be in communication via a plurality of intermediary nodes. The recipient node may comprise another endpoint node. The plurality of intermediary nodes may be any of the intermediary nodes of the system 100.

The sending node may send the network message to a multicast internet protocol (IP) address. Each of the endpoint nodes and the plurality of intermediary nodes may be configured to listen for (e.g., receive/manipulate) data packets that are directed to the multicast IP address. Each of the plurality of intermediary nodes may be configured to determine one or more downstream paths (e.g., end-to-end paths). For example, each of the plurality of intermediary nodes may be configured to determine the one or more downstream paths based on the multicast IP address. Each downstream path of the one or more downstream paths may comprise an "equal cost" path with respect to the sending node and the recipient node based on a number of intermediary nodes associated with each downstream path. Each of the plurality of intermediary nodes may be configured to determine/generate and subsequently send one or more copies of the network message. For example, each of the plurality of intermediary nodes may be configured to determine/generate and subsequently send the one or more copies of the network message to the multicast IP address. Alternatively, or in addition, each of the plurality of intermediary nodes may be configured to determine/generate and subsequently send the one or more copies of the network message via each of the one or more downstream paths. Each copy of the one or more copies of the network message may comprise a node identifier associated with a particular intermediary node of the plurality of intermediary nodes that determined/generated the copy and a destination IP address comprising the multicast IP address. The node identifier may be any value that uniquely identifies a particular node from every other node in the network. For example, the node identifier may be an IP address, a hostname, a hash value, a string of characters, a serial number, a media access control address (MAC address), a combination thereof, and/or the like. At step 510, the recipient node may receive a plurality of copies of the network message from the plurality of intermediary nodes. The plurality of copies of the network message may correspond to a plurality of unique end-to-end paths with respect to the sending node and the recipient node. The recipient node may receive the plurality of copies of the network message via the multicast IP address.

At step 520, the recipient node may determine/generate a plurality of replies to the plurality of copies of the network message. For example, the recipient node may determine/generate a reply for each of the plurality of copies of the network message. The recipient node may add a timestamp to each reply. For example, the timestamp may correspond to a time at which the recipient node received the particular copy of the network message that corresponds to the particular reply. At step 530, the recipient node may send the plurality of replies. For example, the recipient node may send the plurality of replies to the sending node via the plurality of intermediary nodes. The sending node may receive the plurality of replies. The plurality of replies may be associated with the plurality of unique end-to-end paths with respect to the sending node and the recipient node. Each reply of the plurality of replies may correspond to a unique downstream path comprising at least one intermediary node of the plurality of intermediary nodes, the sending node, and the recipient node.

Turning now to FIG. 6, a flowchart of an example method 600 is shown. The method 600 may be used for path determination in networks having multiple end-to-end paths between nodes, such as the network 106 of the system 100. The method 600 may be performed in whole or in part by a single computing device, a plurality of computing devices, and the like. For example, any of the intermediary nodes of the system 100 may be configured to perform the method 600.

A sending node may determine/generate a network message. The sending node may be an endpoint node, such as the endpoint nodes N01, N11, or N12 of the system 100. The network message may comprise a ping/probe packet. The sending node and a recipient node may be in communication via a plurality of intermediary nodes. The recipient node may comprise another endpoint node. The plurality of intermediary nodes may be any of the intermediary nodes of the system 100.

The sending node may send the network message to a multicast internet protocol (IP) address. Each of the endpoint nodes and the plurality of intermediary nodes may be configured to listen for (e.g., receive/manipulate) data packets that are directed to the multicast IP address. Each downstream path of one or more downstream paths (e.g., end-to-end paths) may comprise an "equal cost" path with respect to the sending node and the recipient node based on a number of intermediary nodes associated with each downstream path. At step 610, a first intermediary node of the plurality of intermediary nodes may receive the network message. For example, the first intermediary node may receive the network message from the sending node. The first intermediary node may receive the network message via the multicast IP address. At step 620, the first intermediary node may determine one or more downstream paths. For example, the first intermediary node may determine the one or more downstream paths based on the network message. Alternatively, or in addition, the first intermediary node may determine the one or more downstream paths based on the multicast IP address. At step 630, the first intermediary node may determine/generate one or more copies of the network message. For example, the first intermediary node may determine/generate the one or more copies of the network message based on the one or more downstream paths (e.g., a separate copy for each downstream path). At step 640, the first intermediary node may send the one or more copies of the network message. For example, the first intermediary node may send the one or more copies of the network message to the multicast IP address. The first intermediary node may send the one or more copies of the network message via each of the one or more downstream paths. Each copy of the one or more copies of the network message may comprise a node identifier associated with the first intermediary node and a destination IP address comprising the multicast IP address. The node identifier may be any value that uniquely identifies a particular node from every other node in the network. For example, the node identifier may be an IP address, a hostname, a hash value, a string of characters, a serial number, a media access control address (MAC address), a combination thereof, and/or the like. The one or more copies of the network message sent by the first intermediary node may be received by another intermediary node or by the recipient node. The recipient node may receive one or more copies of the network message. The number of copies of the network message received by the recipient node may correspond to a plurality of unique end-to-end paths with respect to the sending node and the recipient node.

The sending node may receive a plurality of replies to the network message. The sending node may receive the plurality of replies to the network message from the recipient node. The plurality of replies may be associated with the plurality of unique end-to-end paths with respect to the sending node and the recipient node. Each reply of the plurality of replies may correspond to a unique downstream path comprising at least one intermediary node of the plurality of intermediary nodes, the sending node, and the recipient node.

Turning now to FIG. 7, a flowchart of an example method 700 is shown. The method 700 may be used for path determination in networks having multiple end-to-end paths between nodes, such as the network 106 of the system 100. The method 700 may be performed in whole or in part by a single computing device, a plurality of computing devices, and the like. For example, any of the endpoint nodes N01, N11, or N12 of the system 100 may be configured to perform the method 700.

At step 710, a sending node may determine/generate a network message. The sending node may be an endpoint node, such as the endpoint nodes N01, N11, or N12 of the system 100. The network message may comprise a ping/probe packet. The sending node and a recipient node may be in communication via a plurality of intermediary nodes. The recipient node may comprise another endpoint node. The plurality of intermediary nodes may be any of the intermediary nodes of the system 100.

At step 720, the sending node may send the network message. For example, the sending node may send the network message to a multicast internet protocol (IP) address. Each of the endpoint nodes and the plurality of intermediary nodes may be configured to listen for (e.g., receive/manipulate) data packets that are directed to the multicast IP address. Each of the plurality of intermediary nodes may be configured to determine one or more downstream paths (e.g., end-to-end paths). For example, each of the plurality of intermediary nodes may be configured to determine the one or more downstream paths based on the multicast IP address. Each downstream path of the one or more downstream paths may comprise an "equal cost" path with respect to the sending node and the recipient node based on a number of intermediary nodes associated with each downstream path. Each of the plurality of intermediary nodes may be configured to determine/generate and subsequently send one or more copies of the network message. For example, each of the plurality of intermediary nodes may be configured to determine/generate and subsequently send the one or more copies of the network message to the multicast IP address. Alternatively, or in addition, each of the plurality of intermediary nodes may be configured to determine/generate and subsequently send the one or more copies of the network message via each of the one or more downstream paths. Each copy of the one or more copies of the network message may comprise a node identifier associated with a particular intermediary node of the plurality of intermediary nodes that determined/generated the copy and a destination IP address comprising the multicast IP address. The node identifier may be any value that uniquely identifies a particular node from every other node in the network. For example, the node identifier may be an IP address, a hostname, a hash value, a string of characters, a serial number, a media access control address (MAC address), a combination thereof, and/or the like. The recipient node may receive a number of copies of the network message from the plurality of intermediary nodes. The number of copies of the network message may correspond to a plurality of unique end-to-end paths with respect to the sending node and the recipient node.

The sending node may receive a plurality of replies to the network message. The sending node may receive the plurality of replies to the network message from the recipient node. The plurality of replies may be associated with the plurality of unique end-to-end paths with respect to the sending node and the recipient node. Each reply of the plurality of replies may correspond to a unique downstream path comprising at least one intermediary node of the plurality of intermediary nodes, the sending node, and the recipient node. At step 730, the sending node may send the plurality of replies to a collector module. The collector module may be resident at the sending node or at another device/node associated with the network. The collector module may determine a first end-to-end path of the plurality of unique end-to-end paths. For example, the collector module may determine the first end-to-end path based on the plurality of replies. The collector module may cause the sending node and the recipient node to communicate via the first end-to-end path. For example, at step 740, the sending node may receive an instruction from the collector module. The instruction may cause the sending node and the recipient node to communicate via the first end-to-end path. At step 750, the sending node may send one or more network messages to the recipient node via the first end-to-end path. For example, the sending node may send the one or more network messages to the recipient node via the first end-to-end path based on the instruction received from the collector module.

Turning now to FIG. 8, a flowchart of an example method 800 is shown. The method 800 may be used for path determination in networks having multiple end-to-end paths between nodes, such as the network 106 of the system 100. The method 800 may be performed in whole or in part by a single computing device, a plurality of computing devices, and the like. For example, the collector module described herein may be configured to perform the method 800.

A sending node may determine/generate a network message. The sending node may be an endpoint node, such as the endpoint nodes N01, N11, or N12 of the system 100. The network message may comprise a ping/probe packet. The sending node and a recipient node may be in communication via a plurality of intermediary nodes. The recipient node may comprise another endpoint node. The plurality of intermediary nodes may be any of the intermediary nodes of the system 100.

The sending node may send the network message to a multicast internet protocol (IP) address. Each of the endpoint nodes and the plurality of intermediary nodes may be configured to listen for (e.g., receive/manipulate) data packets that are directed to the multicast IP address. Each of the plurality of intermediary nodes may be configured to determine one or more downstream paths (e.g., end-to-end paths) based on the multicast IP address. Each downstream path of the one or more downstream paths may comprise an "equal cost" path with respect to the sending node and the recipient node based on a number of intermediary nodes associated with each downstream path. Each of the plurality of intermediary nodes may be configured to determine/generate and subsequently send one or more copies of the network message. For example, each of the plurality of intermediary nodes may be configured to determine/generate and subsequently send the one or more copies of the network message to the multicast IP address. Alternatively, or in addition, each of the plurality of intermediary nodes may be configured to determine/generate and subsequently send the one or more copies of the network message via each of the one or more downstream paths. Each copy of the one or more copies of the network message may comprise a node identifier associated with a particular intermediary node of the plurality of intermediary nodes that determined/generated the copy and a destination IP address comprising the multicast IP address. The node identifier may be any value that uniquely identifies a particular node from every other node in the network. For example, the node identifier may be an IP address, a hostname, a hash value, a string of characters, a serial number, a media access control address (MAC address), a combination thereof, and/or the like. The recipient node may receive a number of copies of the network message from the plurality of intermediary nodes. The number of copies of the network message may correspond to a plurality of unique end-to-end paths with respect to the sending node and the recipient node.

The sending node may receive a plurality of replies to the network message. The sending node may receive the plurality of replies to the network message from the recipient node. The plurality of replies may be associated with the plurality of unique end-to-end paths with respect to the sending node and the recipient node. Each reply of the plurality of replies may correspond to a unique downstream path comprising at least one intermediary node of the plurality of intermediary nodes, the sending node, and the recipient node.

At step 810, a collector module may receive the plurality of replies. For example, the collector module may receive the plurality of replies from the sending node. The collector module may be resident at the sending node or at another device/node associated with the network. At step 820, the collector module may determine at least one network metrics. For example, the collector module may determine the at least one network metric based on the plurality of replies. The at least one network metric may include a latency associated with an intermediary node of the plurality of intermediary nodes. The at least one network metric may include a failure of an intermediary node of the plurality of intermediary nodes. The at least one network metric may include an amount of available bandwidth of an intermediary node of the plurality of intermediary nodes.

The sending node may initiate the process discussed above on a periodic basis and provide the corresponding replies to the collector module in real-time, at a set interval, pursuant to a reporting schedule, etc. The sending node may provide the corresponding replies directly to the collector module, or the sending node may provide a summary report to the collector module. The collector module may store the corresponding replies received from the sending node. For example, the collector module may store a time series history of all groups of corresponding replies and/or summary reports received from the sending node. At step 830, the collector module may determine at least one network condition. For example, the collector module may determine when the replies and/or summary reports are indicative of an unexpected change in the network. As discussed herein, the collector module may store a time series history of all groups of corresponding replies and/or summary reports received from the sending node. The collector module may use the time series history and machine learning, prediction models, etc., to determine (e.g., detect/derive) the unexpected change—or network metric/conditions indicative of a forthcoming unexpected change. The unexpected change may be a result of a surge in network traffic, a failure of a network component(s), a failure of an upgrade process, and/or the like.

At step 840, the collector module may cause at least one remedial action to be performed. For example, the collector module may determine that a remedial action is required in response to the unexpected change—or a determination of a forthcoming unexpected change. For example, the collector module may cause additional nodes to go online to handle a surge in network traffic or a failure of a network component(s). As another example, the collector module may cause an upgrade process to be rolled back and/or scheduled for completion at a later time that is likely to be less impactful on network performance. Other example remedial actions are possible. As a further example, the collector module may determine a downstream path. For example, the downstream path may be a first end-to-end path of the plurality of unique end-to-end paths. The collector module may determine the first end-to-end path based on the plurality of replies. The collector module may cause the sending node and the recipient node to communicate via the downstream path. For example, the collector module may send an instruction to the sending node. The instruction may cause the sending node and the recipient node to communicate via the first end-to-end path. The sending node may send one or more network messages to the recipient node via the first end-to-end path. For example, the sending node may send the one or more network messages to the recipient node via the first end-to-end path based on the instruction received from the collector module.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
    determining, by a sending node, a network message, wherein the sending node and a recipient node are in communication via a plurality of intermediary nodes that process network messages directed to a multicast IP address according to a network protocol;
    sending the network message via the multicast IP address, wherein the plurality of intermediary nodes each:
        receive, via the multicast IP address, the network message;
        determine, based on the network message and the network protocol, one or more intermediary nodes, of the plurality of intermediary nodes, associated with one or more downstream paths toward the recipient node,
        generate, based on the network protocol and a quantity of the one or more intermediary nodes, one or more copies of the network message, wherein a quantity of the one or more copies of the network message corresponds to the quantity of the one or more intermediary nodes;
        and
        send, based on the network protocol, via the one or more downstream paths and the multicast IP address, the one or more copies of the network message;
    receiving, from the recipient node, a plurality of replies to the network message, wherein each reply of the plurality of replies corresponds to a unique downstream path comprising:
        at least one intermediary node of the plurality of intermediary nodes,
        the sending node, and
        the recipient node;
    and
    determining, based on the plurality of replies, a first end-to-end path for communication between the sending node and the recipient node.

2. The method of claim 1, wherein the network protocol prevents each intermediary node of the plurality of intermediary nodes from sending the one or more copies of the network message upstream towards the sending node.

3. The method of claim 1, wherein each downstream path of the one or more downstream paths comprises an end-to-end path of equal cost with respect to the sending node and the recipient node.

4. The method of claim 1, wherein each copy of the one or more copies of the network message comprises a node identifier associated with an intermediary node of the plurality of intermediary nodes and a destination IP address comprising the multicast IP address.

5. The method of claim 1, wherein the plurality of replies are associated with a plurality of unique end-to-end paths with respect to the sending node and the recipient node, and wherein the method further comprises:
    determining, based on the plurality of unique end-to-end paths, the first end-to-end path; and
    causing the sending node and the recipient node to communicate via the first end-to-end path.

6. The method of claim 1, wherein the network protocol causes each intermediary node of the plurality of intermediary nodes to:
    receive, via a first interface or a first port number, the network message; and
    determine, based on the first interface or the first port number, the one or more intermediary nodes associated with the one or more downstream paths, wherein each downstream path of the one or more downstream paths is associated with: an interface that differs from the first interface, or a port number that differs from the first port number.

7. The method of claim 1, further comprising:
    determining, based on the plurality of replies, at least one of:
        a latency associated with an intermediary node of the plurality of intermediary nodes,
        a failure of an intermediary node of the plurality of intermediary nodes, or
        an amount of available bandwidth of an intermediary node of the plurality of intermediary nodes.

8. A method comprising:
    receiving, by a recipient node via a multicast IP address, a plurality of copies of a network message associated with a sending node, wherein the recipient node and the sending node are in communication via a plurality of intermediary nodes that process network messages directed to the multicast IP address according to a network protocol, and wherein the plurality of intermediary nodes each:
        receive, via the multicast IP address, the network message;
        determine, based on the network message and the network protocol, one or more intermediary nodes, of the plurality of intermediary nodes, associated with one or more downstream paths toward the recipient node,
        generate, based on the network protocol and a quantity of the one or more intermediary nodes, one or more copies of the plurality of copies of the network message, wherein a quantity of the one or more copies corresponds to the quantity of the one or more intermediary nodes;
        and
        send, based on the network protocol, via the one or more downstream paths and the multicast IP address, the one or more copies of the plurality of copies of the network message;
    generating a plurality of replies to the plurality of copies of the network message; and
    sending, to the sending node via the plurality of intermediary nodes, the plurality of replies.

9. The method of claim 8, further comprising:
    receiving, by the sending node, the plurality of replies to the network message; and
    sending, by the sending node to a collector module, the plurality of replies.

10. The method of claim 8, wherein each reply of the plurality of replies corresponds to a unique downstream path comprising at least one intermediary node of the plurality of intermediary nodes and the sending node.

11. The method of claim 10, further comprising:
determining, by a collector module based on the plurality of replies, a network condition; and
causing, by the collector module based on the network condition, at least one remedial action to be performed.

12. The method of claim 8, further comprising:
determining, by a collector module based on the plurality of replies, at least one of:
 a latency associated with an intermediary node of the plurality of intermediary nodes,
 a failure of an intermediary node of the plurality of intermediary nodes, or
 an amount of available bandwidth of an intermediary node of the plurality of intermediary nodes.

13. The method of claim 8, wherein the network protocol prevents each intermediary node of the plurality of intermediary nodes from sending the one or more copies of the plurality of copies of the network message upstream towards the sending node.

14. The method of claim 8, wherein each copy of the plurality of copies of the network message comprises a node identifier associated with an intermediary node of the plurality of intermediary nodes and a destination IP address comprising the multicast IP address.

15. A method comprising:
receiving, by an intermediary node of a plurality of intermediary nodes, via a multicast IP address, a network message associated with a sending node, wherein the plurality of intermediary nodes process network messages directed to the multicast IP address according to a network protocol;
determining, based on the network message and the network protocol, one or more intermediary nodes, of the plurality of intermediary nodes, associated with one or more downstream paths toward a recipient node, wherein each downstream path of the one or more downstream paths comprises a unique end-to-end path with respect to the sending node and the recipient node;
generating, based on the network protocol and a quantity of the one or more intermediary nodes, one or more copies of the network message, wherein a quantity of the one or more copies of the network message corresponds to the quantity of the one or more intermediary nodes; and
sending, based on the network protocol, via the one or more downstream paths and the multicast IP address, the one or more copies of the network message, wherein each copy of the one or more copies of the network message comprises an identifier associated with the intermediary node.

16. The method of claim 15, further comprising:
receiving, from the recipient node, one or more replies to the one or more copies of the network message; and
sending, to the sending node, the one or more replies.

17. The method of claim 15, further comprising:
receiving, by the sending node, one or more replies to the one or more copies of the network message; and
sending, by the sending node to a collector module, the one or more replies.

18. The method of claim 17, further comprising:
determining, by the collector module based on the one or more replies, a network condition; and
causing, by the collector module based on the network condition, at least one remedial action to be performed.

19. The method of claim 15, wherein each copy of the one or more copies comprises a node identifier associated with the intermediary node and a destination IP address comprising the multicast IP address.

20. The method of claim 15, wherein the network message is received by the intermediary node via a first network interface, and wherein sending the one or more copies of the network message comprises:
determining, based on the network protocol, that the one or more copies of the network message are to be sent via a second interface; and
sending, via the second interface, the one or more copies of the network message.

* * * * *